United States Patent [19]
Accerenzi

[11] Patent Number: 5,909,896
[45] Date of Patent: Jun. 8, 1999

[54] BICYCLE FOR CHILDREN WITH STREAMLINED PLASTIC HOUSING

[75] Inventor: Valerio Accerenzi, Bassano Bresciano, Italy

[73] Assignee: Yakari S.r.l., Verolanuovba, Italy

[21] Appl. No.: 08/794,307

[22] Filed: Feb. 3, 1997

[51] Int. Cl.[6] .................................................... B62J 17/00
[52] U.S. Cl. .................... 280/828; 280/288.4; 446/404; 296/78.1; D12/111; D12/126
[58] Field of Search .................... 280/827, 828, 280/288.3, 288.4; 446/440, 470, 404; 296/177, 78.1; D12/110, 111, 126, 127

[56] References Cited

U.S. PATENT DOCUMENTS

| | | | |
|---|---|---|---|
| D. 166,693 | 5/1952 | Lines | D12/111 |
| D. 170,610 | 10/1953 | Sebel | D12/111 |
| D. 200,992 | 4/1965 | Bowden | D12/111 |
| D. 234,352 | 2/1975 | Campbell et al. | D12/111 |
| D. 385,513 | 10/1997 | Huang | D12/111 |
| D. 396,344 | 7/1998 | Tseng | D12/111 |
| 3,233,916 | 2/1966 | Bowden | 280/288.3 |
| 5,314,207 | 5/1994 | Camfield et al. | 280/828 |
| 5,505,493 | 4/1996 | Camfield et al. | 280/828 |

*Primary Examiner*—Kevin Hurley
*Attorney, Agent, or Firm*—McGlew and Tuttle, P.C.

[57] ABSTRACT

A bicycle for children, which has a streamlining made of plastic material enclosing the frame and at least the chain drive system of the bicycle. The streamlining is formed by two opposite shells, which are fixed in a complementary manner and together also define a fender for the rear wheel of the bicycle.

14 Claims, 1 Drawing Sheet

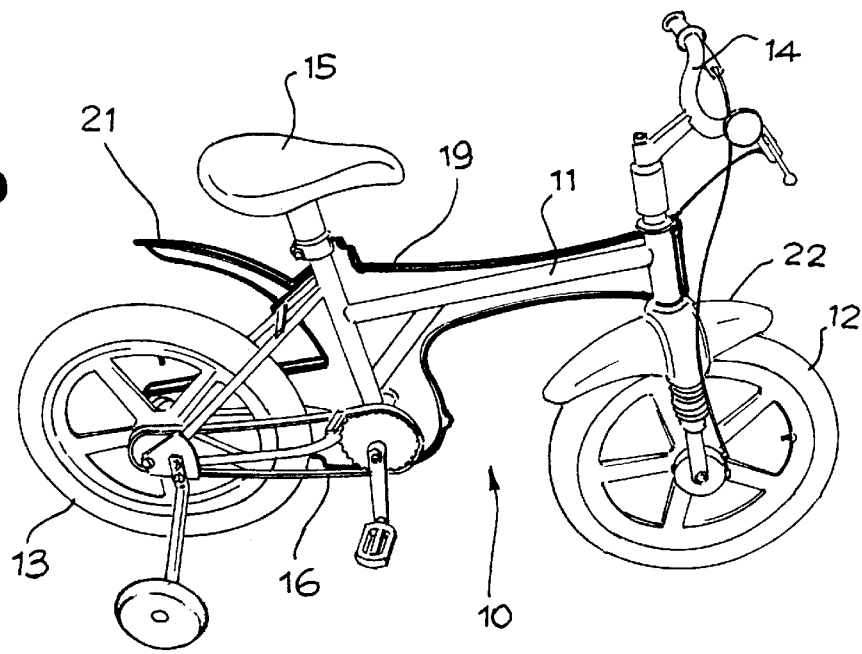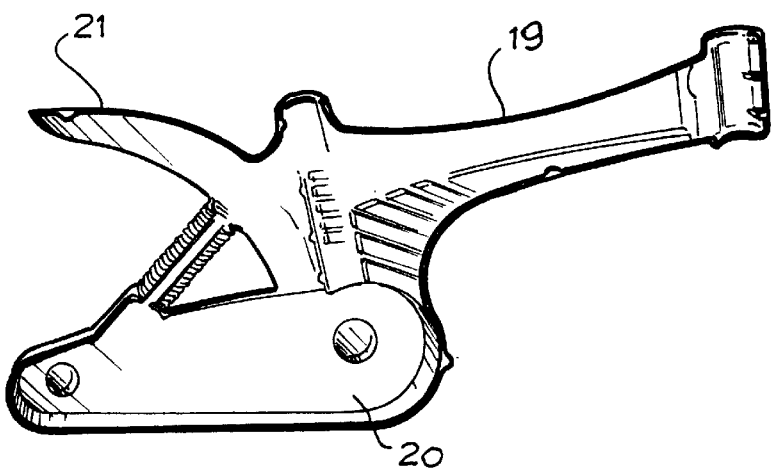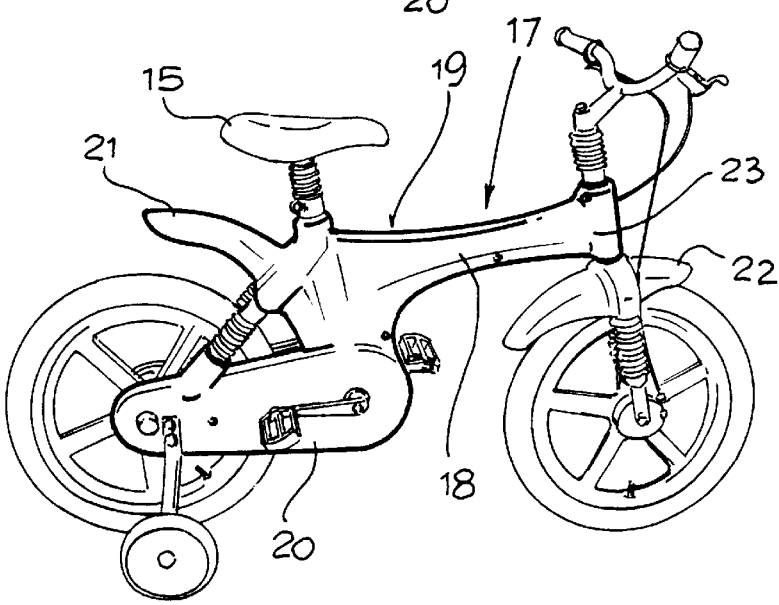

BICYCLE FOR CHILDREN WITH STREAMLINED PLASTIC HOUSING

FIELD AND BACKGROUND OF THE INVENTION

The present invention pertains to bicycles for children.

SUMMARY AND OBJECTS OF THE INVENTION

It has the object of providing a bicycle for children with a streamlining made of plastic material, which encloses the frame and the drive system and also forms at least one fender for the rear wheel, and the fender of the front wheel is inserted, since it must be movable with the steering wheel itself.

Another object of the present utility model is to provide a bicycle with a streamlining, which is simply formed by two shells that can be easily connected to one another, but which is free of support functions and thus is basically not subject to mechanical stresses.

Therefore, on the one hand, the advantages are obtained that the frame of the bicycle must not necessarily be completely finished with surface treatments, painting, decorations, etc., and that some of its defects, superficial but not structural, are masked by the streamlining without aesthetic problems. On the other hand, the streamlining, which can be made from molding plastic material, may have various shapes, colors as desired, various ornaments for a finish that is suitable and as required of bicycles.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 shows one shell of the streamlining, the other shell being a mirror image;

FIG. 2 shows a bicycle with only one streamlining shell applied to it to show the frame; and FIG. 3 shows the completely streamlined bicycle.

DETAILED DESCRIPTION OF THE PREFERRED EMBODIMENTS

In the drawings, 10 indicates overall a bicycle for children with a frame 11 supporting the front and rear wheels 12, 13 with handlebars and seat 14, 15 and chain drive system 16. The bicycle 10 is provided with a streamlining housing or fairing housing 17 which encloses its frame 11 and at least the drive system 16.

The streamlining housing 17 is formed by two shells 18, 19, which are shaped to enclose the various parts of the frame 11 in a complementary manner, to function as a chain guard 20 for the drive system, and to form a fender or mudguard 21 for the rear wheel 13. The fender 22 for the front wheel is, however, separate and inserted.

Preferably, the two shells 18, 19 of the streamlining are mirror images of one another so as to form a chain guard similar to that for protecting the drive system even on the opposite side of the bicycle that may not have the drive system.

The two shells 18, 19 are joined in a complementary manner and are fixed to one another by means of screws 23. They may have any shape and any color and provide a surface which may then be complemented with applique work and/or adorning decorations.

While specific embodiments of the invention have been shown and described in detail to illustrate the application of the principles of the invention, it will be understood that the invention may be embodied otherwise without departing from such principles.

What is claimed is:

1. A childrens' bicycle comprising:

a frame;

a front and rear wheel attached to said frame;

a chain drive system for driving said rear wheel;

a fairing housing made of plastic and enclosing said frame and said chain drive system, said housing being formed of only first and second shells joined and fixed in a complementary manner, said first shell including a mudguard portion and said second shell including a mudguard portion, said first shell mudguard portion and said second shell mudguard portion cooperating to form a mudguard, said first shell including a chain guard portion and said second shell including a chain guard portion, said first shell chain guard portion and said second shell chain guard portion cooperating to form a chain guard provided on each side of said frame.

2. A childrens bicycle in accordance with claim 1, wherein:

said housing is a streamlining fairing.

3. A childrens bicycle in accordance with claim 2, wherein:

said mudguard of said first and second shells is in the form of a fender for said rear wheel.

4. A childrens bicycle in accordance with claim 2, wherein:

said first and second shells are mirror images of each other, said chain guard portions of said first and second shells provide for protection of said drive system on each side of said frame.

5. A childrens bicycle in accordance with claim 3, wherein:

said first and second shells are mirror images of each other, chain guard portions of said first and second shells provide for protection of said drive system on each side of said frame.

6. A childrens bicycle in accordance with claim 1, wherein:

said housing including said chain guard portions for said chain drive system is shaped mirror image identical on opposite sides of said frame.

7. A childrens bicycle in accordance with claim 1, wherein:

said housing provides a streamlining and a surface for art work.

8. A childrens bicycle in accordance with claim 1, wherein:

said housing completely encloses said frame from front to back.

9. A childrens bicycle in accordance with claim 1, wherein:

said housing is a streamlining fairing.

10. A childrens bicycle comprising:

a frame;

a front and rear wheel attached to said frame;

a chain drive system for driving said rear wheel;

a first fairing housing shell made of plastic, said first shell including a mudguard portion and a chain guard portion;

a second fairing housing shell made of plastic, said second fairing housing shell including a mudguard portion and a chain guard portion, said second fairing housing shell being substantially the mirror image of the first fairing housing shell, said second fairing housing shell cooperating with said first fairing housing shell to form a chain guard provided on each side of said frame for protection of said drive system on each side of said frame, said chain guard being formed of only said second fairing housing shell and said first fairing housing shell, said second fairing housing shell cooperating with said first fairing housing shell to form a mudguard, said second fairing housing shell cooperating with said first fairing housing shell to enclose said frame.

11. A childrens bicycle in accordance with claim 10, wherein:

said mudguard of said first and second shells is in the form of a fender for said rear wheel.

12. A childrens bicycle in accordance with claim 10, wherein:

said housing provides a streamlining and a surface for art work.

13. A childrens bicycle in accordance with claim 10, wherein:

said housing completely encloses said frame from front to back.

14. A childrens bicycle comprising:

a tube bicycle frame including a tube frame member connecting a headstock to a seat post;

a front and rear wheel attached to said frame;

a chain drive system for driving said rear wheel;

a first fairing housing shell made of plastic, said first shell including a mudguard portion and a chain guard portion;

a second fairing housing shell made of plastic, said second fairing housing shell including a mudguard portion and a chain guard portion, said second fairing housing shell being substantially the mirror image of the first fairing housing shell, said second fairing housing shell cooperating with said first fairing housing shell to form a chain guard provided on each side of said frame for protection of said drive system on each side of said frame, said chain guard being formed of only said second fairing housing shell and said first fairing housing shell, said second fairing housing shell cooperating with said first fairing housing shell to form a mudguard, said second fairing housing shell cooperating with said first fairing housing shell to substantially completely enclose said frame, said frame fully providing support and said first fairing housing shell and said second fairing housing shell being free of a support function.

* * * * *